United States Patent
Nelson et al.

(10) Patent No.: US 6,808,270 B2
(45) Date of Patent: Oct. 26, 2004

(54) CLOSED LOOP THREE COLOR ALIGNMENT FOR DIGITAL PROJECTION

(75) Inventors: David J. Nelson, Rochester, NY (US); Barry D. Silverstein, Rochester, NY (US); William Y. Fowlkes, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 290 days.

(21) Appl. No.: 10/038,950

(22) Filed: Jan. 3, 2002

(65) Prior Publication Data

US 2003/0122972 A1 Jul. 3, 2003

(51) Int. Cl.[7] ............................................. G03B 21/14
(52) U.S. Cl. ............................ 353/69; 348/745; 353/31
(58) Field of Search ......................... 353/31, 69, 122; 348/745, 806

(56) References Cited

U.S. PATENT DOCUMENTS

| | | | | |
|---|---|---|---|---|
| 4,662,777 A | * | 5/1987 | Newton | 404/25 |
| 4,683,467 A | * | 7/1987 | Macaulay et al. | 345/9 |
| 5,020,116 A | * | 5/1991 | Macaulay | 382/162 |
| 5,170,250 A | * | 12/1992 | Ledebuhr | 348/745 |
| 5,231,481 A | * | 7/1993 | Eouzan et al. | 348/658 |
| 5,592,239 A | * | 1/1997 | Hara et al. | 348/771 |
| 5,729,245 A | * | 3/1998 | Gove et al. | 345/84 |
| 6,369,863 B1 | * | 4/2002 | Smith | 348/744 |
| 6,422,704 B1 | * | 7/2002 | Gyoten et al. | 353/122 |

* cited by examiner

*Primary Examiner*—William C. Dowling
(74) *Attorney, Agent, or Firm*—Nelson Adrian Blish

(57) ABSTRACT

A digital projector that has closed loop three color alignment comprising a light source where an optical engine (50) splits a beam of light from the light source into first, second, and third wavelength bands. A first, second, and third spatial light modulator (11, 12, 16) imparts image data and first, second, and third fiducial data respectively to the first, second, and third wavelength bands. The first, second, and third wavelength bands are directed to the first, second, and third spatial light modulator (11, 12, 16), respectively. A combiner combines the modulated first, second, and third wavelength bands. A diverter (19) diverts a portion of the combined modulated wavelength bands to at least one sensor. The sensor (21) then senses a relative position of the fiducials and sends the position information to a microprocessor. The microprocessor then determines an error based on the relative position of the fiducials. The microprocessor sends a signal to at least one component of the system to resolve the error.

24 Claims, 8 Drawing Sheets

CLOSED LOOP THREE COLOR ALIGNMENT FOR DIGITAL PROJECTION

CROSS REFERENCE TO RELATED APPLICATIONS

Reference is made to commonly-assigned copending U.S. patent application Ser. No. 10/038,948, filed Jan. 3, 2002, entitled A CLOSED LOOP THREE COLOR ALIGNMENT SYSTEM FOR A DIGITAL PROJECTOR, by Nelson et al., the disclosure of which is incorporated herein.

FIELD OF THE INVENTION

This invention relates in general to a digital projection system and in particular to a closed loop three color alignment system for digital projectors.

BACKGROUND OF THE INVENTION

In a digital projection system involving the use or three separate light-modulating devices such as LCDs or micro-mirrors, image convergence depends upon the accurate registration of the three separate images created by the light modulating elements. For simplicity sake, we will look at this invention with regard to, but not limited in scope to implementation with an LCD device. With poor image convergence, the contrast and sharpness of the image both suffer, and in addition fringing of the image may occur. For example, a white dress may have a green fringe on one side and a red fringe on the other when shown against a dark background. These degradations are obviously undesirable in a projection system. Adding to the chance of poor convergence is the likelihood of higher and higher resolutions for a variety of applications including digital cinema. With these higher resolutions comes increasing difficulty in achieving and maintaining convergence (usually a fraction of a pixel) due to the smaller pixels on the devices. In a device with large temperature changes such as a projector, even with attention to the thermal expansion of the LCD fixturing and other optical components, positional fixturing without complex designs or extravagant materials has a finite practical limit that is currently the same order of magnitude as the pixel size.

A current method of performing a six-degree of freedom alignment (x, y, z, and rotations around x, y, and z) is to use a fixture to align the image modulating devices and hold them in place while they are fixed using solder or adhesive to a set of pads built into the optical system. The image modulating devices can then be removed from the fixture and re-used. This type of alignment can take a long time especially if the fixture adjustments are not entirely orthogonal and independent. (Rotation adjustments are seldom possible around the exact center of an image modulating device.) For example, in rotating the image modulating device around the z-axis to eliminate a skew error, one could potentially also be altering its position in x and y. This method requires high precision fixturing, and possibly many iterations to achieve the required alignment. Even if the proper alignment is achieved with the fixture, errors in the final position of the image modulating devices can result. For example, though this method is performed with the image modulating devices and projector running, due to the need for access to the device, the system may not have all of it's covers and cooling operational. Therefore, as the alignment is not performed at the projector's working temperature, this can lead to positional errors, and a resulting lack of color convergence when the projector is run completely assembled at a different operating temperature. Convergence using this method can also suffer from positional inaccuracies resulting from induced stresses in the joints caused by the solder cooling or the adhesive shrinking. This is a one-time adjustment and does not allow for realignment at a later date.

An alternate method is to provide manual adjustments on some or all of the axes in the projector to enable in-projector alignment. This method is potentially expensive as the precision adjustment remains with the projector, potentially cumbersome in terms of getting adjustments for all of the stages to fit, and difficult to design athermally. For some applications, it may also be possible to rely on simply butting the image modulating devices to datum structures within the projector. Even with precisely ground components and tight manufacturing tolerances, this method is seldom accurate enough for high-resolution systems.

Macauley et al. discloses an image registration system in U.S. Pat. No. 4,683,467 which registers multiple images on a screen. This system makes use of sensors mounted to the screen as input for the correction system. Because the detection takes place at the screen, photodetectors are required to be located on or near the screen detracting from the viewing experience.

Ledebuhr in U.S. Pat. No. 5,170,250 shows an internal image registration system which is suitable for use in a projector. The light valves produce alignment beams which are sensed internal to the projector by photodetectors to control the CRT light valves. A disadvantage of this invention is that a spatial relationship needs to be maintained between the three photodetectors. Such a system is not capable of correcting for either skew or focus. In addition, the correction methods used will not work for image modulating devices such as LCDs and micro-mirrors which cannot be aligned electronically to high resolution.

Hara et al. in U.S. Pat. No. 5,592,239 disclose a projector device with the capability to properly register the image in translation and rotation. However, the device is only able to be used during an off-line alignment of the projector because the detection system is not suited to closed loop operation whilst projecting images.

There is a need for a method and apparatus for creating and maintaining proper pixel alignment without requiring high-precision fixtures and projector components. Also there is a need for a method and apparatus for performing a continuous image registration in a projection system.

SUMMARY OF THE INVENTION

The problems discussed above can be overcome and better performance achieved with a closed loop system for aligning and maintaining the alignment of these devices. Briefly, according to one aspect of the present invention a digital projector that has closed loop three color alignment comprises a light source where an optical engine splits a beam of light from the light source into first, second, and third wavelength bands. A first, second, and third spatial light modulator imparts image data and first, second, and third fiducial data respectively to the first, second, and third wavelength bands. The first, second, and third wavelength bands are directed to the first, second, and third spatial light modulator, respectively. A combiner combines the modulated first, second, and third wavelength bands. A diverter diverts a portion of the combined modulated wavelength bands to at least one sensor. The sensor then senses a relative position of the fiducials and sends the position information to a microprocessor. The microprocessor then determines an error based on the relative position of the fiducials. The microprocessor sends a signal to at least one component of the system to resolve the error.

Consistently better image quality can be achieved by eliminating thermal errors in the mounting of image modulating devices in real time providing perfect registration over a wide temperature range. An additional benefit is that the initial alignment to mount the image modulating devices need only be as good as a few pixels simplify the fixuring and procedures required. The design of the projector can also be made simpler by not requiring as good thermal stability of the image modulating devices and associated optics mounting.

The border pixels of the three separate image modulating devices to provide a fiducial pattern that can be used for alignment, for example multiple pixels in each corner of the device. Upon recombination of the light from each of the three devices, the single light path is split into two components. The majority of light will be the normally projected image area, while the remainder of light, containing the fiducial information in the border areas is cropped. This small amount of light (also containing the fiducial surround) is directed to a sensor, which will be used to determine the pixel locations of the fiducial pattern and in turn, determine the required positional. Determination of which device requires positional adjustment can be done utilizing many means, including, but not limited to a selective application of filters to separate the colors, or by illuminating the fiducial patters on the three image modulating devices in a predetermined sequence. If a correction is required, actuators on the red and blue image modulating device mounts are powered to bring them back into alignment with the green reference channel.

In one embodiment of this idea, if alignment to within a half pixel is adequate, it would be possible eliminate the actuators and make all of the correction electronically, shifting where the row and column data begins and ends separately for the three channels. The simplest useful correction would be a simple x and y translation which would require only one fiducial point. A more useful correction accounting for possible skew requires at least two fiducial points. Embodiments performing these types of correction can be implemented moving optical components such as mirrors, prisms or simply the image modulating devices.

DETAILED DESCRIPTION OF THE INVENTION

Figure 1:
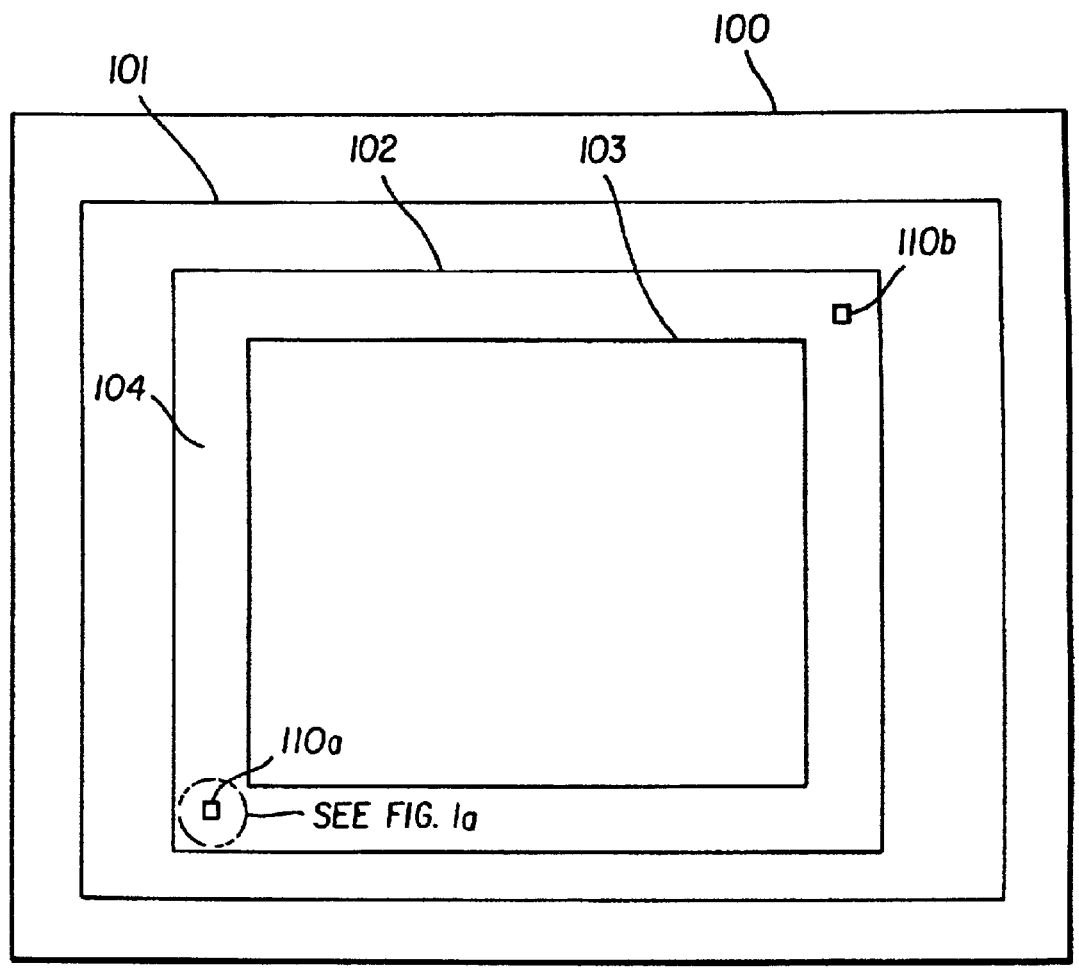
FIG. 1 shows an image modulating device with border pixels being used in the method.
Figure 1A:
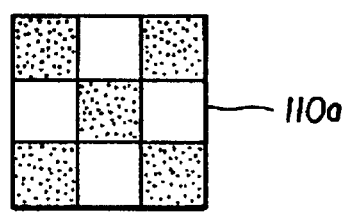

Turning now to FIG. 1, an image modulating device assembly is shown. It consists of an image modulating device mounting plate 100 to which an image modulating device 101 is bonded. This mounting plate is used to fix the image modulating device into the optical system. The attachment of the image modulating device to the optical system can be done by soldering or bonding it to a mating surface in the optical system. Contained within the image modulating device is an active pixel area 102 containing active pixels which can be imaged-wise turned on and off. This active pixel area is further broken down into a central pixel area 103 to be used for the projected image, and a surrounding area to be used for fiducials 104. This surrounding area of the three separate image modulating devices can be used to provide a fiducial pattern that can be used for alignment, for example a spot in each corner. The size of the surrounding area is not important to the invention, but is preferably small such that a majority of the active pixels can be used for the image. It is also preferred to leave a buffer section of unused pixels between the active area used for imaging 103 and the active area used for fiducials 104. This is desirable such that the fiducial detection devices which will be discussed do not themselves have to be aligned accurately to the image. To facilitate detection by the sensor 21 of FIG. 2, it is also possible that the fiducials 110a and 110b comprise more than one pixel. The fiducial can be can be made up of a combination of on pixels surrounded by off pixels, or off pixels surrounded by on pixels. Similarly, they may be defined in particular patterns, such as cross shapes or other patterns which may enable recognition of a deviation from the proper co-aligned state. An example of such a pattern is shown in the detail enlargement of fiducial 110a.

The following discussion applies to FIGS. 2–5. All of these figures show illumination optics 30, an optical engine 50, and a fiducial monitoring and projection section 70. There are many configurations of illumination optics 30, optical engines 50 commonly practiced, and the specifics of the illumination optics 30, and the optical engine are not critical to the invention, but are included for completeness.

A lamphouse 1 provides illumination for the projector. A cold mirror 3, separates the visible light from the infrared to limit the amount of heat introduced to the remainder of the optics. Input optic lenses 2 shape the beam for efficient coupling of the visible illumination into integrating bar 4 which is then used make the light, relayed to the image modulating devices 11, 12, and 16, by lens 5, more uniform. The white light is then split into three spectral bands, typically red, green, and blue, using dichroic filters 6 and 8, each spectral band provided with a means of polarization separation, such as polarization beamsplitters 9, 10, and 15. Each spectral band is therefore polarized upon reflection prior to reaching image modulating devices 11, 12, and 16. Image modulating devices 11, 12, and 16 are mounted on actuation devices 13, 14, and 17 respectively. These actuation devices are used to provide the registration alignment of the images from each of the three spectral bands. Image modulating devices 11, 12, and 16 containing arrayed pixels can rotate the incoming polarization on an individual basis, thereby causing the light reflected off these devices 11, 12, and 16 to transmit through the dielectric polarizing coatings of beamsplitters 9, 10, and 15.

Figure 2:
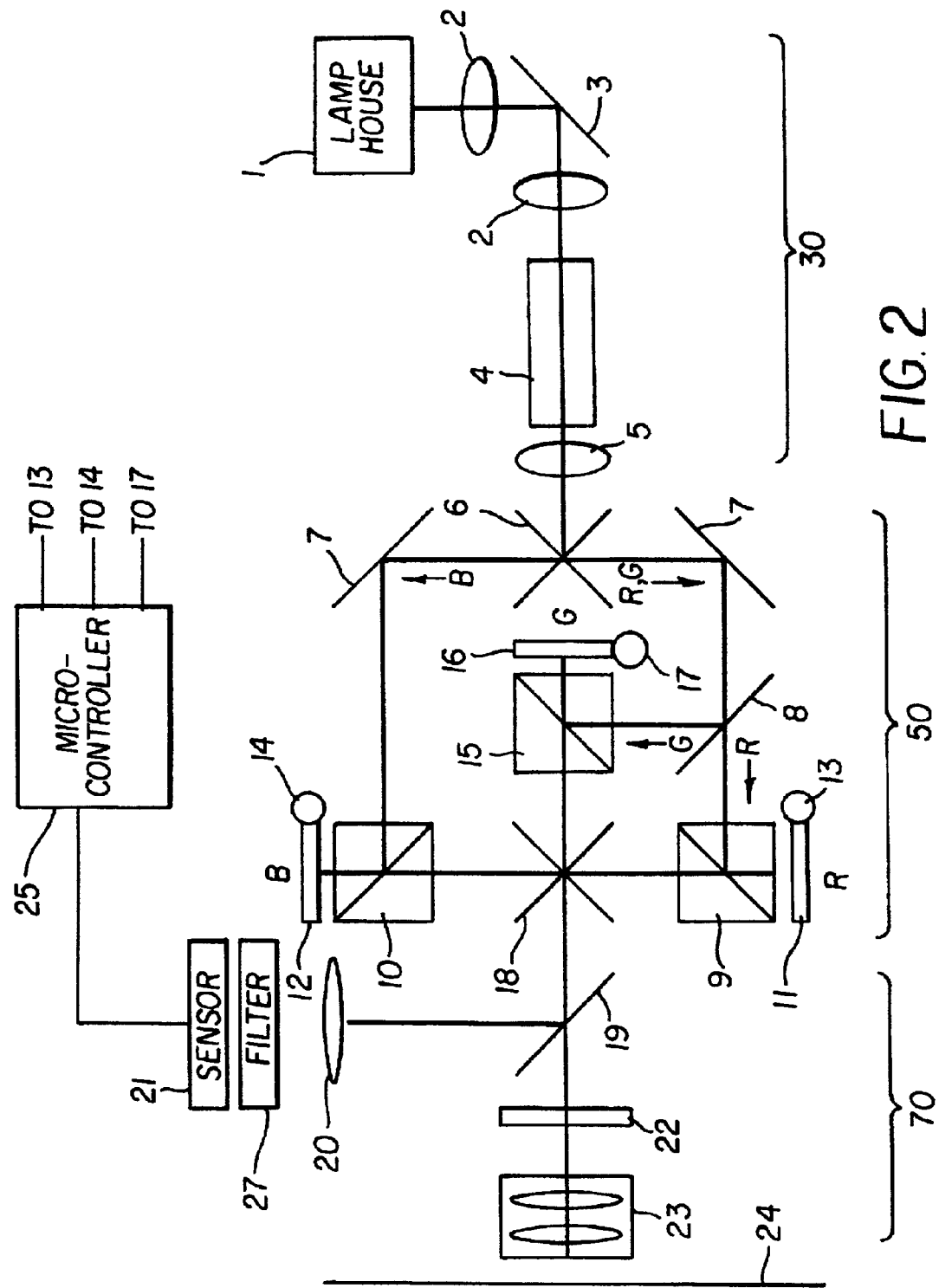
FIG. 2 shows the complete optical system of a preferred embodiment.

Referring now specifically to FIG. 2, in the fiducial monitoring and projection section 70, following the dichroic recombining element 18 of the optical engine 50, a partial mirror 19 is placed to sample the illumination. An example of such a device is a plate glass with a dielectric anti-reflection coating on the second surface. The first surface, being uncoated, will have reflection according to Fresnel reflection laws. Alternatively, this first surface may be coated with a dielectric coating to provide for a tuned amount of reflection. The majority of the light continues through the partial mirror, the fiducials are removed by a mask 22 which occludes the area inside the active pixel area used for fiducials 104, and is projected to a viewing screen 24 as in any other projector using a projection lens 23. The fraction of light diverted by the partial mirror 19 is then imaged by a lens 20 onto a sensor 21, which is able to gather pixel locations of the fiducial marks. An example sensor may be a single CCD imager, or two smaller CCD imagers placed only to detail the image of the fiducials, a photodiode, or any other light-sensing device. These pixel locations are then sent to and operated on the microcontroller 25 which, using an algorithm to be described later determines based on the positions of the fiducial pattern on all three channels, if a correction is required. This determination results in control signals to one or more of the image modulating device actuators 13, 14, and 17. These actuators then in turn translate or rotate the image modulating devices 11, 12, and 16 such that thy are brought into correct alignment with each other. This sensor determines the pixel locations of the fiducial pattern on all three colors and determine if a correction is required. If a correction is required, actuators 13, 14, and 17 on the red and blue image modulating device mounts are powered to bring them back into alignment with the green reference channel.

There are several methods which can be employed to present the fiducial information in 110a and b to the sensor 21. In a preferred embodiment, the image modulating devices 11, 12 and 16 image the fiducial marks 110 sequentially in a predetermined temporal sequence such that a monochrome sensor can be used. For example, if the predetermined order is green, red, blue, delay. The green image modulating device 16 displays it's fiducials while the red and blue image modulating devices are blank. The pixel locations on the monochrome sensor 21 are stored in memory, and then the red image modulating device 11 fiducial pattern 110 is activated, and the locations of the red fiducial pattern are stored. Finally, the same procedure is repeated with the blue device 12 such that the monochrome sensor has now gathered the pixel locations of all three colors. These stored pixels locations are then analyzed by a microprocessor 25 to determine whether or not they are in acceptable convergence. The microprocessor is able to clock using the delay and then register the separate color signals in order to differentiate which fiducial signal corresponds to which image modulating device.

A second embodiment introduces a series of colored filters 27 in front of a monochrome sensor. Firstly a green filter is placed in front of the sensor allowing the green fiducial information to be gathered. Continuing in a similar fashion, the fiducial data from each color can then be individually gathered by a monochrome sensor. This method enables each of the image modulating devices to display their fiducial information continuously. For convenience, the three color filters are likely placed on a rotating wheel.

A third embodiment is to simply use a color sensor. In all of the embodiments, it is important that the sensor have adequate resolution to adequately capture the fiducial information. As corrections of fractions of a pixel are required to maintain a high quality image on the screen, it is required that each fiducial 110 be mapped onto multiple sensor pixels.

It should be noted that although the invention is shown with the ability to translate and/or rotate all three light modulation devices, that this is not a requirement of the invention. One of the image modulation devices may be permanently mounted in a fixed position and used as a reference for the other two colors. This is most likely the green channel 16 and 17, and in future will be discussed as the fixed channel.

Many configurations are possible, however, the exact configuration is not critical to the invention. All optical engines that split the light so it is modulated by at least two separate light modulation devices will benefit from the invention.

Figure 3:
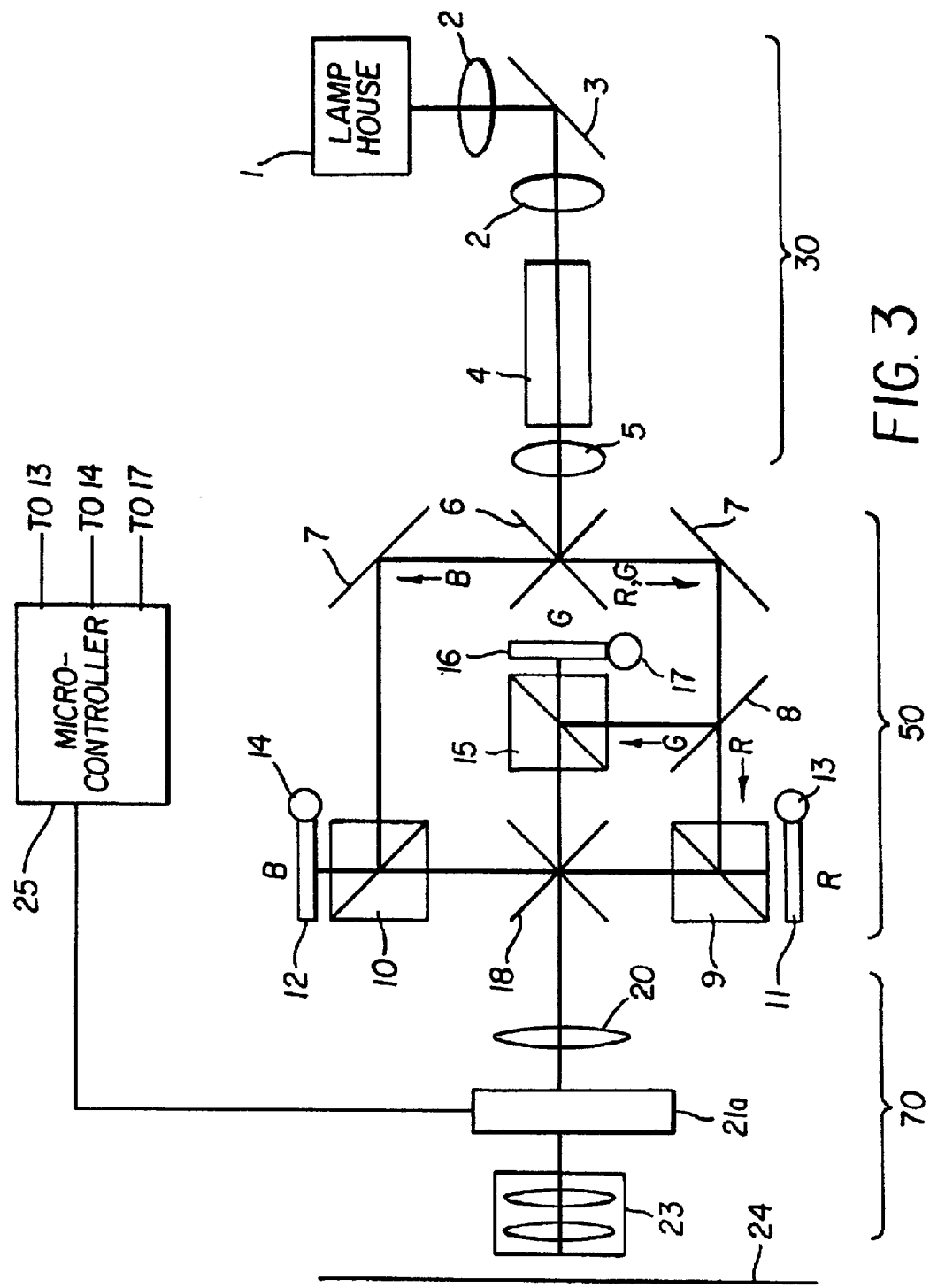
FIG. 3 shows a variation of the preferred embodiment in the fiducial monitoring portion.

Referring now to FIG. 3, the input optics 30, and optical engine 50 are identical to those of FIG. 2 and will not be discussed in detail again. The partial mirror 19 of FIG. 2 has been replaced by a periphery sensor 21a. A significant advantage is realized as this sensor replaces the partial mirror 19, the sensor 21 and the mask 22 of the previous method and serves all three functions. A lens 20 is required such that the periphery sensor is at a focused image plane. The sensor 21a both gathers the fiducial data 110, and blocks it from being projected to the screen 24 by the projection lens 23. Because the sensor is being place in a large amount of illumination, it may be desirable to have a light reducing element integral to the sensor. In addition, because of the absorbed light energy, the mounting for a periphery sensor may require a heat sink (not shown).

It may be impractical to insert a sequence of filters 27 into such a system as if they occluded any of the active pixel area designated for images 103, the image would be degraded. It is therefore preferred that in this embodiment, either a color sensor is used on the periphery, or the temporal discrimination method discussed earlier is used with a monochrome sensor. As before, the microprocessor 25 determines whether the fiducials, and therefore the images are in acceptable convergence. If not, appropriate corrections are made either electronically (adjusting the start and stop rows and columns for the channels) or mechanically (adjusting the physical locations of the sensors or rotating optical mirrors) such that the fiducials and therefore images again line up. Due to the tighter control of the manufacturing process for the sensors, it may be assumed that if the fiducials line up, then so do the images.

Figure 4:
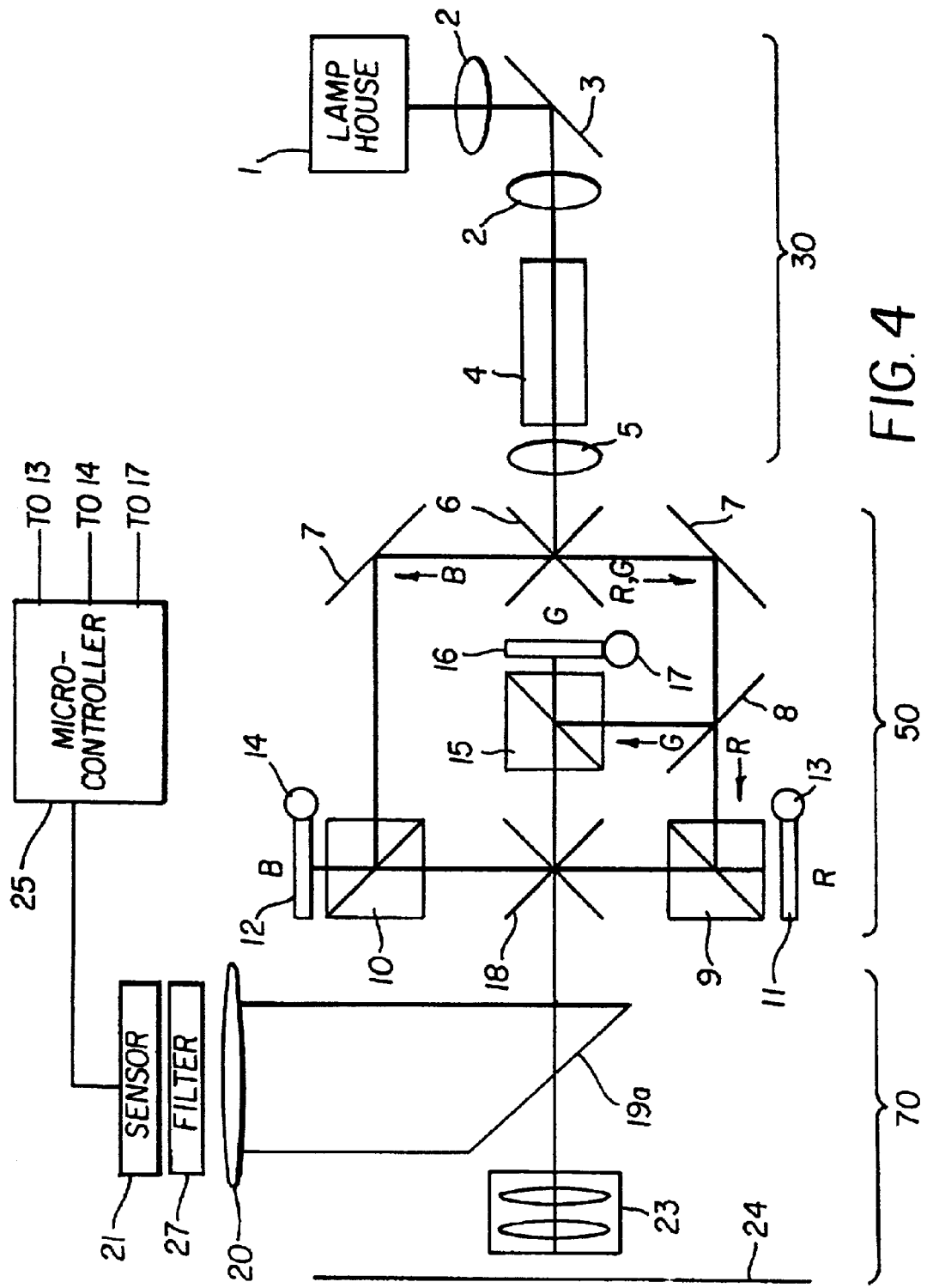
FIG. 4 shows another variation of the preferred embodiment in the fiducial monitoring portion.

Turning now to FIG. 4, as before, the input optics 30, and optical engine 50 remain unchanged. In this embodiment, rather than inserting a digital periphery sensor 21a into the path, a simpler periphery mirror 19a is inserted. This periphery mirror 19a, unlike the partial mirror 19, obscures all of the active pixel area used for fiducials, therefore eliminating the need for a separate mask. The fiducial information is then relayed to the sensor 21 by a lens 20, and the remainder of the process is as described earlier. As before due to the amount of illumination being diverted, it may be advantageous for the sensor to include a light reducing element.

Figure 5:
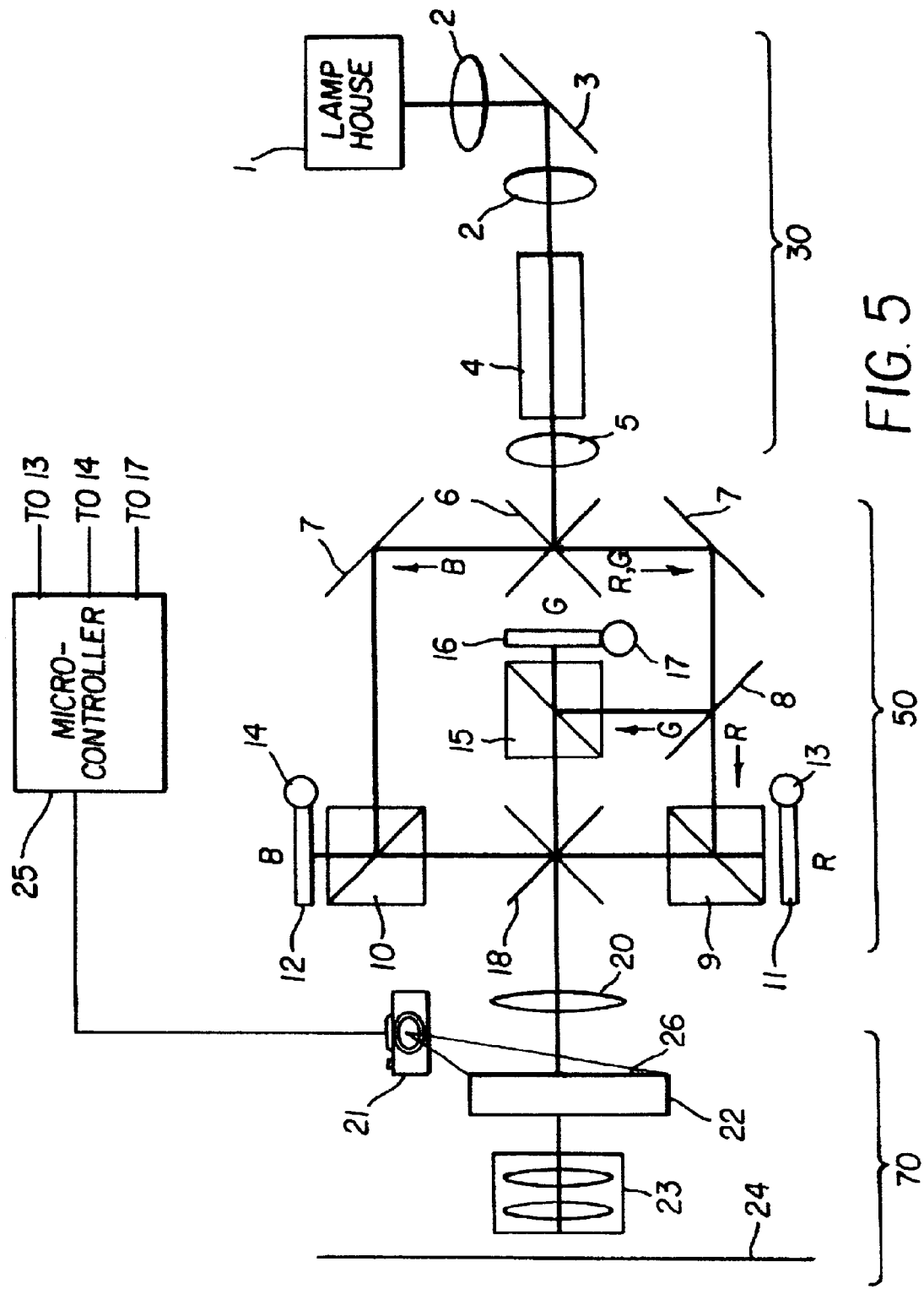
FIG. 5 shows another variation of the preferred embodiment in the fiducial monitoring portion.

Another embodiment is shown in FIG. 5. A mask 22, is inserted into the light path to block the fiducial information from being projected. As was the case in FIG. 3, a lens is required to provide a focused image at the imaging surface 26 of the mask 22. This imaging surface is preferably flat and able to provide good contrast when impinged upon by the fiducial information. An image sensor 21, such as a CCD camera, then captures the reflected light from the mask 22 and supplies the fiducial information to the microprocessor 25 as before. A heat sink may be required due to the amount of illumination being absorbed, and the reflected light becomes stray light inside the projector and is preferably absorbed before it can be projected causing undesirable flare.

The microprocessor 25 establishes a control loop. After collecting the positional information from the sensor 21, an algorithm determines an appropriate corrective action. This control loop can be repeated immediately for a continuous closed loop correction. Depending on the algorithm used by the microprocessor, however, this might cause excessive corrections to be made. For example, if the algorithm has too small a "dead-band" or amount of acceptable error, it might be found that if the means of correction does not have adequate resolution, a correction is implemented each time the loop is run in the opposite direction. For this reason, and to save on processing/actuating power etc. a significant delay might be implemented between successive corrections. Given the relatively slow time constant for the most likely thermal and other disturbances to the system, this should not be a problem.

Whereas the positions of the fiducial markings on the sensor could be used for the feedback to the actuator, it may be desirable to have a separate positional feedback at the image modulating device site. In such an embodiment, based on sensor input, the controller can send a discrete move distance and direction to the actuator that will then have the capability to reliably achieve the desired position without further feedback from the fiducial sensor. This decoupling of the feedback loops has certain advantages. Firstly, the actuator is not limited to the rather slow expected time constant of the vision system. For example, piezoelectric motors working with integrated capacitive displacement sensors can achieve response times in a few milliseconds which is considerable faster than the vision system can or is required to operate. Secondly, it is desirable to be able to isolate problems in the system to either the vision system, or the actuator, which would not be possible in a single feedback loop. Thirdly, there are off the shelf controller systems, which are designed to work with paired actuators and position systems.

It is recognized that the resulting error when looking at the sum of the differences of the distance between the reference channel and the other two channels may not ever be able to reach zero. In an ideal world of course with the ability to correct for x, y, and skew errors, this should be possible. However, as lenses refract differing wavelengths of light to a different degree, there may be magnification differences between the color channels as well as differences resulting from manufacturing of the image modulating devices. Neither magnification nor lack of squareness of the fiducial pattern can be corrected using this method. It is therefore recommended that an error be allowed, and the algorithm programmed to minimize this error.

The type of actuation required will produce very small displacements precisely (on the order of a few microns). The ideal actuator produces this amount of displacement in a small package. Preferred are piezoelectric actuators for their small package size, reliability, quick performance, commercial availability, and precision. When coupled with a flexure mounted stage setup, piezo actuators can provide a low friction/stiction movement with adequate precision and travel range. For example the P-500 series multi-axis piezo flexure nano-positioners from Polytec PI Inc. in Auburn, Mass. would have the appropriate capabilities for this application including a version with all 6 degrees of freedom and its own feedback.

Piezo motors can be costly. This invention is not limited to the use of these motors. One skilled in the art could certainly envision many other alternatives such as stepper motors with appropriately scaled down displacement ranges through levers and lead screw.

Figure 6:
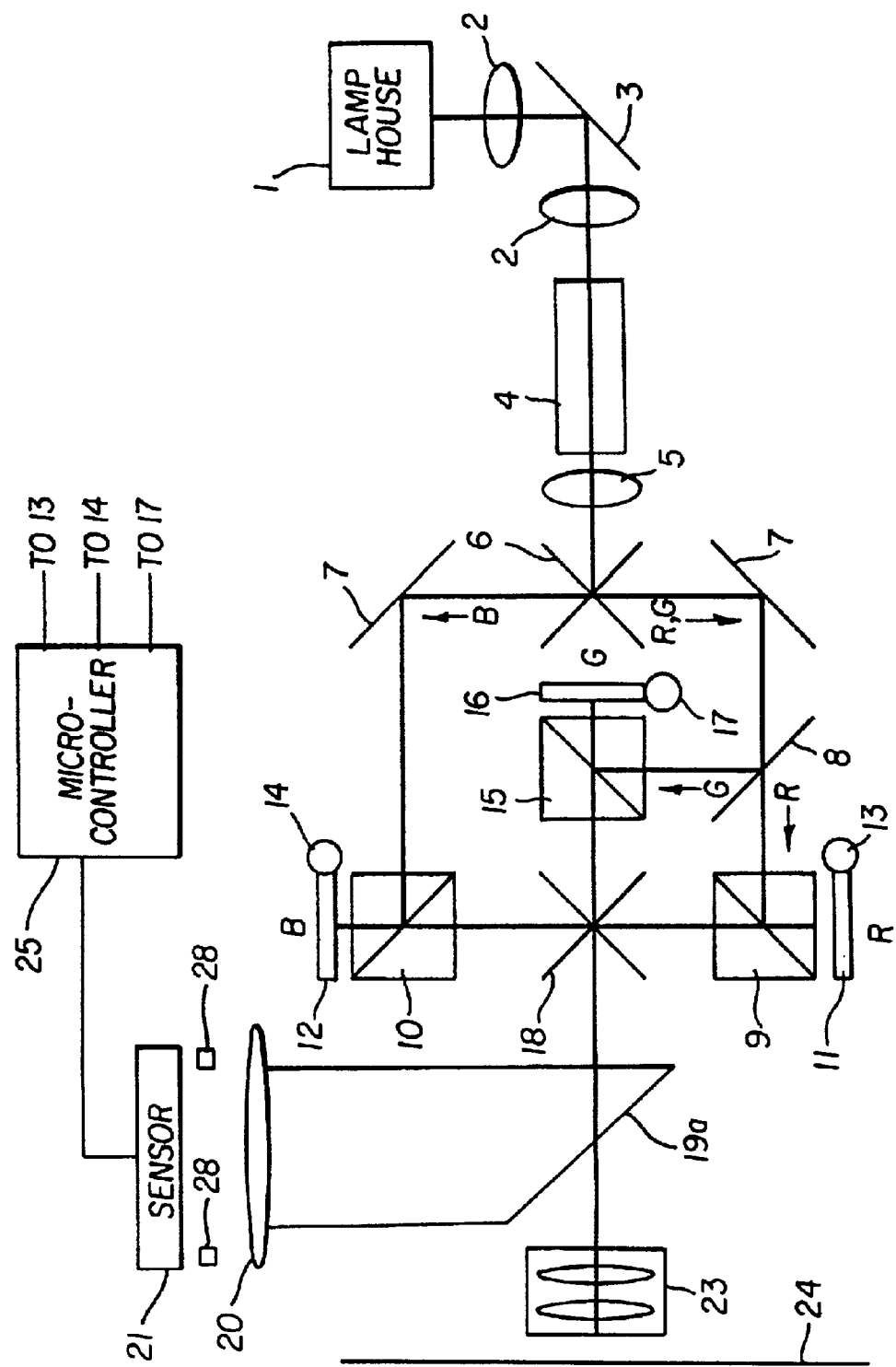
FIG. 6 shows a variation of the preferred embodiment with focus sensing optics and fiducials.
Figure 7:
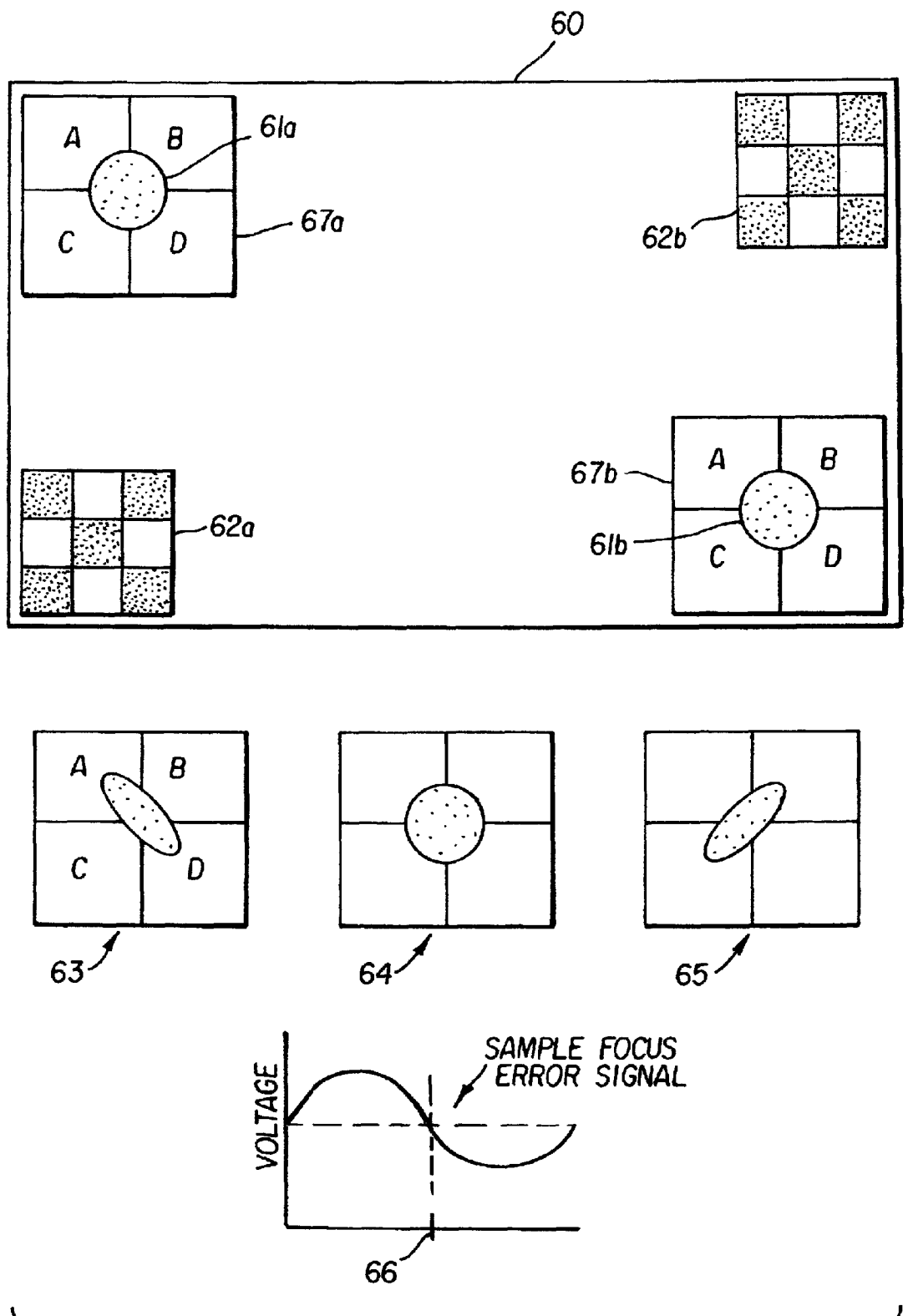
FIG. 7 shows focus sensing fiducials, sensors, spot shape upon defocus, and a sample focus error signal.

Turning now to FIGS. 6 and 7. The main invention as described would not correct for focus, luckily there is usually less precision required in the plane of the optical path. If focus correction were critical to a design, all 6 degrees of freedom could be detected. This system can be implemented to also correct for relative defocus of the image modulating devices. One method would be to over sample the fiducials with the CCD sensor. An algorithm could be created in order to minimize the number of pixels that the fiducials occupy on the CCD. This would be disadvantaged in that in order to determine the optimum position of focus, the image modulating device must be moved. An alternate approach would be to create a specific fiducial set for focus detection. One example would be to use a round spot fiducial, as shown in FIGS. 61a and 61b on the image plane of fiducials 62a and 62b used for convergence correction. Optics can be implemented such that astigmatism and power is induced into the round spot of these fiducials. For example, placing a cylinder lens, spherical lens combination into the field that relates to the diagonal imaging the focus fiducials as in FIG. 28. Quad sensors, FIGS. 67a and 67b, are placed in the image plane of these fiducials, with its cells at a 45 degree angle with respect to the cylinder lens creating the astigmatism. The position of the quad cell is such that best focus is at the "disk of least confusion" for the image of the fiducial. This intermediate image between the two line focus positions created by the cylindrical lenses is round as shown in FIG. 64. Upon defocus of the image modulating device in one direction, the "disk of least confusion" begins to form a line focus, as in FIG. 63. This effectively removes light off of two of the cells, b and c of the quad detector, and places it on the alternate two cells, a and d. Similarly, if the image modulating device is defocused in the opposite direction, the opposite two cells gain the additional light. In this fashion, by adding the light levels from the diagonal cells and subtracting this from the other diagonal cells and normalizing this by the sum of all cells, a directionally deterministic signal, as shown in FIG. 66, is created which is independent of light level. Implementation of this type of system is well known in the art. Examples may be found in many camera systems and optical recording systems. Other similarly common means of focus detection may be used for this application.

Figure 8A:
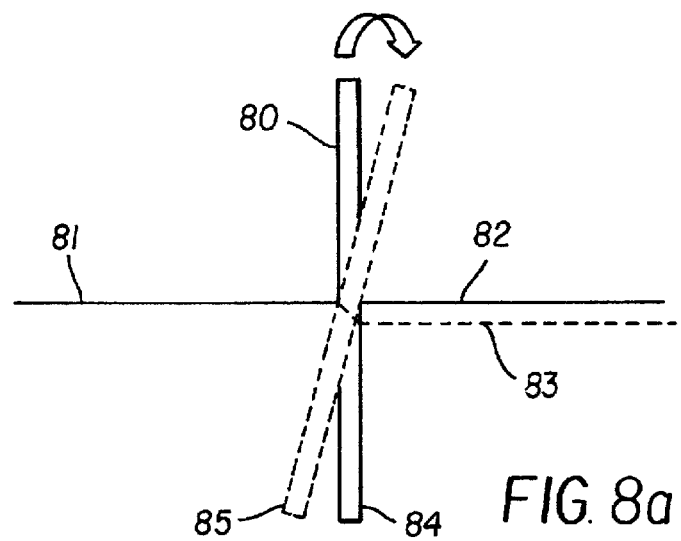
FIG. 8a shows an optical correction device which allows for a translation of the image.

FIG. 8a shows an optically transparent plate 80 which can be used to translate the image. The plate as illustrated has the capability to rotate between two angularly different positions 84 and 85 such that the light beam 81 is translated between corresponding positions 82 and 83. Two such plates or a single plate which has the ability to tip and tilt in two directions can be used to translate the image in both the x and y directions. The plate 80 can be inserted in the optical path in many locations, most preferably between the polarizer cube 9, 10 and 15 and the combining x-cube 18. Alternatively, the plate 80 can be inserted between the polarizer cube 9, 10 and 15, and the image modulating device 11, 12, and 16.

Figure 8B:
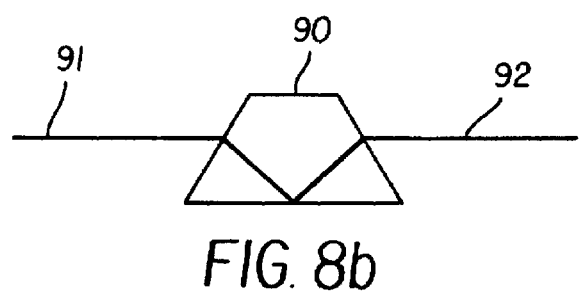
FIG. 8b shows an optical correction device which allows for a rotation of the image.
Figure 8C:
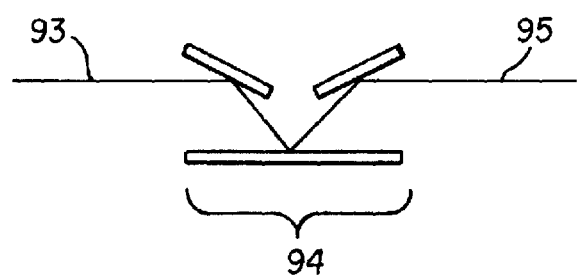
FIG. 8c shows an optical correction device which allows for a rotation of the image.

FIGS. 8b and 8c show two methods of optically rotating an image. Prism 90 when rotated causes twice the amount of rotation to occur between the light beam 91 and the output light beam 92. Similarly a K mirror 94 provides the same ability to rotate the light beam 93 and output light beam 95. The prism 90 and K mirror 94 can be placed in the optical system in the same positions previously discussed for the optically transparent plate 80.

The invention as described supposes a 6 degree of freedom actuation possibility for at least two of the image modulating devices, however, there are many embodiments which can be implemented more simply.

Firstly, if alignment to within a half a pixel were adequate, it would be possible to do away with the actuators entirely and make all of the corrections electronically, shifting where the row and column data begins and ends separately for the three channels. Electronic correction such as this is practiced commonly, and is described in U.S. Pat. No. 5,729,245 by Gove et al. Obviously, in such a system, no capability exists for either skew correction or focus correction. However, many less critical applications can tolerate as much as a half a pixel correction, and such a system is much simpler to implement with no moving parts in the image modulating device area. In all systems involving substantial correction which occurs all at one time, such as is the case when the spatial light modulator driver signals are indexed by a pixel, it is desirable to make these corrections at a time when it is least impactful on the viewing of the images. Ideally, large immediate corrections to the image alignment should be performed during scene changes or when the image field is substantially uniform. Other more subtle corrections performed mechanically or optically can be implemented continuously or discretely without regard to scene content without negatively impacting the viewing experience.

A second embodiment which also is simpler to implement than a six degree of freedom correction is a mechanical correction of x and y only. In addition to simpler actuating mechanisms, a great advantage can be realized in such a system by recognizing that only one fiducial point per color channel is required. Only requiring a single point to be imaged on the sensor 21 allows for either greater resolution or a much smaller sensor.

A third embodiment is to eliminate the three focus corrections, and simply correct for skew, and x and y translations. This level of correction requires at least two fiducial points, and three independent actuators. Such an embodiment eliminates three degrees of freedom creating a simpler actuation mechanism, but maintains the ability to perform the most sensitive corrections for convergence. It is desirable in such a system to design a large depth of focus at the image modulation device.

A fourth embodiment is to use the same fiducial gathering methods as discussed, but keep all of the image modulating elements fixed. The convergence and focus correction can then be achieved through the actuation of other optical elements in the optical engine. As shown, prisms or k-mirrors can be rotated rather than rotating the image modulating device, and planar transparent optical plate elements can be rotated in two directions providing an effective x and y translation.

A fifth embodiment would be to use all of the detection and correction means described above in an off-line calibration routine. The existing invention, as described, requires "wasting" of a few border rows and columns, which could be used for image data. In addition, for continuous correction, in many of the fiducial gathering embodiments, the invention requires that a small amount of light, which would add to the screen illumination, be diverted to a sensor. If these limitations are critical for a design, an off-line calibration routine could still be done while the projector is not showing image data using the same method. Any of the mechanical, optical, or electronic correction means could be used.

A sixth embodiment combines the use of mechanical and electronic correction. The electronic correction can be used as a means of coarsely aligning the image modulating device in x and y, thus permitting the use of a mechanical actuator with a lesser positional operating range. Without the constraints of a larger operating range, actuators with much higher resolutions can be used making finer correction possible. In addition, the correction algorithm can implement an electronic pixel correction if the mechanical actuator runs out of operating range.

Many other embodiments can be conceived combining some elements of electronic, optical and mechanical correction. For example, it may be beneficial in a system to perform the x and y correction electronically, and then the skew correction with a prism or mechanical actuator.

The invention has been described in detail with particular reference to certain preferred embodiments thereof, but it will be understood that variations and modifications can be effected within the scope of the invention.

PARTS LIST

1. Lamp-house
2. Input Optic Lens
3. Cold Mirror
4. Integrating Bar
5. Input Optic
6. Separating x-cube
7. Mirrors
8. Beamsplitter
9. Red polarizer cube
10. Blue polarizer cube
11. Red image modulating device
12. Blue image modulating device
13. Red image modulating device actuator
14. Blue image modulating device actuator
15. Green polarizing cube
16. Green image modulating device
17. Green image modulating device actuator
18. Combining x-cube
19. Partial mirror
19a. Periphery mirror
20. Lens
21. Digital sensor
21a. Periphery digital sensor/Mask combination
22. Mask
23. Projection lens
24. Projection screen
25. Micro-controller
26. Imaging surface
27. Color filters
28. Cylindrical/spherical lenses
30. Input optics
50. Optical engine
50. Fiducial detection plane
61a. Image of Focus Fiducial 1
61b. Image of Focus Fiducial 2
62a. Image of Fiducial 1
62b. Image of Fiducial 2
63. Early Defocused Image Of Focus Fiducial
64. In Focus Image of Focus Fiducial
65. Late Focus Image of Focus Fiducial
66. Sample Focus Error Signal
70. Fiducial Monitoring and Projection Portion
100. Image modulating mounting plate
101. Image modulating device
102. Active pixel Area
103. Area inside active pixel area used for image
104. Area inside active pixel area used for fiducial pixels
110a. Fiducial 1
110b. Fiducial 2

What is claimed is:

1. A digital projector having closed loop three color alignment comprising:

a light source;

an optical engine which splits a beam of light from said light source into first, second, and third wavelengths bands;

a first, second, and third spatial light modulator which imparts image data and first, second, and third fiducial data respectively to said first, second, and third wavelengths bands;

wherein said first, second, and third wavelengths bands are directed respectively to said first, second, and third, spatial light modulator;

a combiner which combines said modulated first, second, and third wavelengths bands;

a diverter which diverts a portion of said combined modulated wavelengths bands to at least one sensor;

wherein said sensor senses a relative position of the each of said fiducials and sends said position information to a microprocessor;

wherein said microprocessor determines an error based on said relative position of said fiducials;

wherein said microprocessor sends a signal to at least one component of said system to resolve said error; and wherein said fiducial data comprises a multiplicity of spatially separated fiducials each comprising a multiplicity of pixels in a predetermined pattern.

2. A digital projector as in claim 1 wherein a first and a second sensors are located to capture at least two of said fiducials.

3. A digital projector as in claim 1 where fiducial data for each of said first, second, and third wavelength bands is located in a same spatial position relative to said image data.

4. A digital projector as in claim wherein said diverter diverts all of said fiducial data to said sensor.

5. A digital projector as in claim 1 wherein said spatial light modulators impart fiducial data to said first, second, and third wavelength bands in a predetermined sequence.

6. A digital projector as in claim 1 wherein said sensor collects said fiducial data from each of said first, second, and third wavelength bands in a predetermined sequence.

7. A digital projector as in claim 1 wherein said microprocessor determines said wavelength band by the predetermined sequence.

8. A digital projector as in claim 1 wherein said sensor discriminates between multiple wavelength bands.

9. A digital projector as in claim 1 wherein said spatial light modulators are LCDs.

10. A digital projector as in claim 1 wherein said spatial light modulators are digital micro-mirrors.

11. A digital projector as in claim 1 wherein uniformizing optics are located between said light source and said optical engine.

12. A digital projector as in claim 1 wherein said light source is a xenon lamp.

13. A digital projector as in claim 1 wherein said light source is a laser.

14. A digital projector as in claim 1 wherein a mask separates said fiducials from a projected image.

15. A digital projector having closed loop three color alignment comprising:

a light source;

an optical engine which splits a beam of light from said light source into first, second, and third wavelengths bands;

a first, second, and third spatial light modulator which imparts image data and first, second, and third fiducial data respectively to said first, second, and third wavelengths bands;

wherein said first, second, and third wavelengths bands are directed respectively to said first, second, and third, spatial light modulator;

a combiner which combines said modulated first, second, and third wavelengths bands;

a sensor which senses a relative position of the each of said fiducials and sends said position information to a microprocessor;

wherein said microprocessor determines an error based on said relative position of said fiducials;

wherein said microprocessor sends a signal to an actuator on at least one of said spatial tight modulators to resolve said error; and wherein a mask separates said fiducials from a projected image.

16. A digital projector as in claim 15 wherein said mask is mounted with a heat dissipating unit.

17. A digital projector as in claim 15 wherein said fiducial data is imaged onto said mask and said sensor is an imaging system which collects said fiducial data from said mask.

18. A digital projector as in claim 15 wherein said sensor is comprised of a first and second sensor wherein said first and second sensors are located on corners of said mask.

19. A digital projector having closed loop three color alignment comprising:

a light source which produces first, second, and third wavelengths bands;

a first, second, and third spatial light modulator which imparts image data and first, second, and third fiducial data respectively to said first, second, and third wavelengths bands;

wherein said first, second, and third wavelengths bands are directed respectively to said first, second, and third, spatial light modulator;

a combiner which combines said modulated first, second, and third wavelengths bands;

a diverter which diverts a portion of said combined modulated wavelengths bands to at least one sensor;

wherein said sensor senses a relative position of the each of said fiducials and sends said position information to a microprocessor;

wherein said microprocessor determines an error based on said relative position of said fiducials;

wherein said microprocessor sends a signal to at least one component of said system to resolve said error; and wherein a first and a second sensors are located to capture at least two of said fiducials and said fiducials are spatially separated.

20. A digital projector as in claim 19 wherein said fiducial data comprises a multiplicity of pixels in a predetermined pattern.

21. A digital projector having closed loop three color alignment comprising:

a light source;

an optical engine which splits a beam of light from said light source into first, second, and third wavelengths bands;

a first, second, and third spatial light modulator which imparts image data and first, second, and third fiducial data respectively to said first, second, and third wavelengths bands;

wherein said first, second, and third wavelengths bands are directed respectively to said first, second, and third, spatial light modulator;

a combiner which combines said modulated first, second, and third wavelengths bands;

a diverter which diverts a portion of said combined modulated wavelengths bands to at least one sensor;

wherein said sensor senses a relative position of the each of said fiducials and sends said position information to a microprocessor;

wherein said microprocessor determines an error based on said relative position of said fiducials;

wherein said microprocessor sends a signal to at least one component of said system to resolve said error; and wherein an element between said diverter and said sensor reduces an amount of light impinging on said sensor.

22. A digital projector having closed loop three color alignment comprising:

a light source;

an optical engine which splits a beam of light from said light source into first, second, and third wavelengths bands;

a first, second, and third spatial light modulator which imparts image data and first, second, and third fiducial data respectively to said first, second, and third wavelengths bands;

wherein said first, second, and third wavelengths bands are directed respectively to said first, second, and third, spatial light modulator;

a combiner which combines said modulated first, second, and third wavelengths bands;

a diverter which diverts a portion of said combined modulated wavelengths bands to at least one sensor;

wherein said sensor senses a relative position of the each of said fiducials and sends said position information to a microprocessor;

wherein said microprocessor determines an error based on said relative position of said fiducials;

wherein said microprocessor sends a signal to at least one component of said system to resolve said error; and wherein a first sensor determines position and a second sensor detects focus.

23. A digital projector having closed loop three color alignment comprising:

a light source;

an optical engine which splits a beam of light from said light source into first, second, and third wavelengths bands;

a first, second, and third spatial light modulator which imparts image data and first, second, and third fiducial data respectively to said first, second, and third wavelengths bands;

wherein said first, second, and third wavelengths bands are directed respectively to said first, second, and third, spatial light modulator;

a combiner which combines said modulated first, second, and third wavelengths bands;

a diverter which diverts a portion of said combined modulated wavelengths bands to at least one sensor;

wherein said sensor senses a relative position of the each of said fiducials and sends said position information to a microprocessor;

wherein said microprocessor determines an error based on said relative position of said fiducials;

wherein said microprocessor sends a signal to at least one component of said system to resolve said error; and wherein wavelength filters are presented in a predetermined sequence in front of said sensor.

24. A digital projector having closed loop three alignment comprising:

a light source;

an optical engine which splits a beam of light from said light source into first, second, and third wavelengths bands;

a first, second, and third spatial light modulator which imparts image data and first, second, and third fiducial data respectively to said first, second, and third wavelengths bands;

wherein said first, second, and third wavelengths bands are directed respectively to said first, second, and third, spatial light modulator;

a combiner which combines said modulated first, second, and third wavelengths bands;

a sensor which senses a relative position of the each of said fiducials and sends said position information to a microprocessor;

wherein said microprocessor determines an error based on said relative position of said fiducials;

wherein said microprocessor sends a signal to an actuator on at least one of said spatial light modulators to resolve said error; and wherein said sensor is on a mask.

* * * * *

UNITED STATES PATENT AND TRADEMARK OFFICE
CERTIFICATE OF CORRECTION

PATENT NO. : 6,808,270 B2  Page 1 of 1
DATED : October 26, 2004
INVENTOR(S) : David J. Nelson et al.

It is certified that error appears in the above-identified patent and that said Letters Patent is hereby corrected as shown below:

Column 11,
Line 30, delete "where" insert -- wherein said --
Line 33, after "claim" insert -- 1 --

Signed and Sealed this

Nineteenth Day of April, 2005

JON W. DUDAS
*Director of the United States Patent and Trademark Office*